United States Patent
Narayan et al.

(10) Patent No.: US 11,966,882 B2
(45) Date of Patent: Apr. 23, 2024

(54) METHOD AND SYSTEM FOR SCHEDULING A RIDE SERVICE FOR ONE OR MORE THIRD PARTIES

(71) Applicant: ZUM SERVICES, INC., Belmont, CA (US)

(72) Inventors: Ritu Narayan, San Carlos, CA (US); Vivek Garg, San Mateo, CA (US); Abhishek Garg, Cambridge, MA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 17/397,468

(22) Filed: Aug. 9, 2021

(65) Prior Publication Data
US 2022/0012691 A1    Jan. 13, 2022

Related U.S. Application Data

(63) Continuation of application No. 15/411,840, filed on Jan. 20, 2017, now Pat. No. 11,087,286.

(51) Int. Cl.
| | | |
|---|---|---|
| *G06Q 10/1093* | (2023.01) | |
| *G06Q 50/00* | (2012.01) | |
| *H04L 51/52* | (2022.01) | |
| *H04L 67/10* | (2022.01) | |
| *H04L 67/51* | (2022.01) | |
| *H04L 67/52* | (2022.01) | |
| *H04W 4/02* | (2018.01) | |
| *H04W 4/40* | (2018.01) | |

(52) U.S. Cl.
CPC ......... *G06Q 10/1093* (2013.01); *H04L 51/52* (2022.05); *H04L 67/10* (2013.01); *H04L 67/51* (2022.05); *H04L 67/52* (2022.05); *G06Q 50/01* (2013.01); *H04W 4/02* (2013.01); *H04W 4/40* (2018.02)

(58) Field of Classification Search
CPC .... G06Q 10/1093; G06Q 50/01; H04L 67/51; H04L 67/52; H04L 51/52; H04L 67/10; H04W 4/40; H04W 4/02
USPC ...................................................... 507/7.18
See application file for complete search history.

(56) References Cited

U.S. PATENT DOCUMENTS

| | | |
|---|---|---|
| 9,805,605 B2 | 10/2017 | Ramanujam |
| 9,998,420 B2 | 6/2018 | Jimenez Pazmino et al. |
| 10,192,387 B2 | 1/2019 | Brinig et al. |

(Continued)

OTHER PUBLICATIONS

Jamal Yousaf, Juanzi Li, A Driver and Riders Matching Approach, Department of, Computer Science and Technology, Tsinghua National Laboratory for Information Science and Technology, Tsinghua University, Beijing, 100084, China.{jamalyousaf,ljz}@ keg.tsinghua.edu.cn (Year: 2014).*

(Continued)

*Primary Examiner* — Abdallah A El-Hage Hassan
(74) *Attorney, Agent, or Firm* — Loyal IP Law, PLLC; Travis Banta

(57) ABSTRACT

This disclosure generally relates to a method and system for requesting a ride for a third party rider. In one embodiment, a user device may be used to transmit a ride request to a server for a third party rider. The user device may receive an indication of a driver from a set of trusted drivers among a pool of drivers. Further, the user device and a device associated with the third party user may receive a ride confirmation.

20 Claims, 9 Drawing Sheets

(56) References Cited

U.S. PATENT DOCUMENTS

| | | | |
|---|---|---|---|
| 10,325,228 | B2 | 6/2019 | Khan |
| 10,972,884 | B2 | 4/2021 | Khan |
| 2005/0114014 | A1* | 5/2005 | Isaac .................. G01C 21/26 701/465 |
| 2008/0270019 | A1* | 10/2008 | Anderson ............ G06Q 50/30 705/1.1 |
| 2015/0339928 | A1* | 11/2015 | Ramanujam .......... G08G 1/202 701/23 |
| 2017/0124506 | A1* | 5/2017 | Khan ................. G06Q 30/0282 |
| 2017/0127215 | A1* | 5/2017 | Khan ................... H04W 12/64 |
| 2017/0163591 | A1* | 6/2017 | Jimenez Pazmino ....................... H04L 67/1095 |
| 2017/0236230 | A1* | 8/2017 | Thomas ............... H04L 67/535 705/325 |
| 2018/0101925 | A1* | 4/2018 | Brinig ................ G07F 17/0057 |
| 2018/0204158 | A1* | 7/2018 | Ratti ............... G06Q 10/06315 |

OTHER PUBLICATIONS

H. A. N. C. Bandara*, Dileeka Dias**, A Multi-Agent System for Dynamic Ride Sharing, Faculty of Information Technology, University of Moratuwa, Sri Lanka *054018m@uom.lk, ** dileeka@uom.lk, Fourth International Conference on Industrial and Information Systems, (Year: 2009).*

Christoph Stach, Andreas Brodt, vHike—A Dynamic Ride-sharing Service for Smartphones, Universität Stuttgart Institut für Parallele und Verteilte Systeme Universitätsstraße 3870569 Stuttgart.de, 2011 12th IEEE International Conference on Mobile Data Management. (Year: 2011).*

* cited by examiner

METHOD AND SYSTEM FOR SCHEDULING A RIDE SERVICE FOR ONE OR MORE THIRD PARTIES

BACKGROUND

1. Technical Field

This disclosure relates generally to a method and system for requesting and scheduling a ride service for one or more third parties. More specifically, the system disclosed herein receives a ride service request from a user device to provide a ride service for a third party. Further disclosed is a method for providing a ride service provider and the third party with information related to the ride service.

2. Description of the Related Art

As the public has become more conscious of environmental concerns, and has experienced the financial strain of commuting, the public has demanded better solutions for transportation. In response, car pools were created to allow many people to ride together in one vehicle from one general area to another general area (i.e., from a residential district of a city where each rider lives to a downtown district of a city where each rider works). Many cities have created mass transportation systems, including streetcars, trains, light rail, buses, cabs, and other mass transport.

Each of these solutions have positive benefits and negative externalities that make at least some potential users uncomfortable. More recently, ride sharing technology has been developed which allows a user to request a ride for one or more people from one place to another. The user may transmit a request to a server associated with a number of drivers who are willing to provide a ride service for the one or more people. For example, the user may transmit a request for a ride service to transport him and his roommate home from a party. In response, a driver associated with the ride service transports the user and his roommate home from a party. The user pays a fee to the driver associated with the ride service for the ride service.

Ride sharing has become ubiquitous in many large cities in the United States. However, one limitation of conventional ride sharing technology is that ride sharing relies on the judgement and experience of the user to determine whether or not a particular driver should be trusted to safely transport the user from one place to another. Thus, potential users who lack the judgment and experience to properly identify a safe driver are at risk when they are offered a ride in a conventional ride sharing situation. For example, a young child may need a ride to a piano lesson while the child's parents are working. In a conventional ride share program, the young child must rely on his less informed judgment and experience to identify whether or not his parents would approve of a driver who purports to be the child's driver. Many parents worry immeasurably at the thought of their child getting into a vehicle with a driver unknown to them.

Other people with diminished judgement may be similarly at risk. For example, some elderly people with memory weakness or dementia, disabled individuals with reduced communication or cognitive ability, young children, sick people, intoxicated people, people under the influence of narcotics or other drugs, and others who may not be able to distinguish a safe driver from an unsafe driver. Further, many of these same individuals lack either the capacity or the ability to request a ride service for themselves.

Accordingly, it is one object of this disclosure to provide a system in which a user may request a ride service for a third party. It is another object of this disclosure to provide a system whereby the user can request a ride service for a third party who is experiencing reduced mental capacity or lacks the experience and judgment to identify a safe driver and a safe ride service environment. It is another object of this disclosure to provide a system which may notify both a driver and a third party of a ride service request requested by the ride requestor. Finally, it is a further object of this disclosure to provide a method allowing a user to schedule a ride service for one or more third party users using a driver from a trusted pool of drivers.

SUMMARY

Disclosed herein is a method of requesting a ride for a third party rider by a ride requestor. The method includes transmitting, by a user device, a ride request to a server for a third party rider. The method further includes receiving, by the user device, an indication of a driver from a set of trusted drivers among a pool of drivers. Finally, the method includes receiving, by the user device and a device associated with the third party rider, a ride confirmation.

Further disclosed herein is a system for requesting a ride for a third party rider by a ride requestor. The system includes a processor included in a user device to transmit a ride request to a server for a third party rider. The user device may receive, from the server, an identification of a driver from a set of trusted drivers among a pool of drivers. The user device may also receive, from the server, a ride confirmation.

Also disclosed is a non-transitory computer-readable medium containing instructions which, when executed by a processor, cause the processor to transmit a ride request to a server for a third party rider. The processor is also caused to receive, from the server, an identification of a driver from a set of trusted drivers among a pool of drivers. Finally, the processor is further caused to receive, from the server, a ride confirmation.

BRIEF DESCRIPTION OF THE DRAWINGS

The accompanying drawings illustrate various embodiments of the method and system for scheduling a ride service for one or more third parties.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
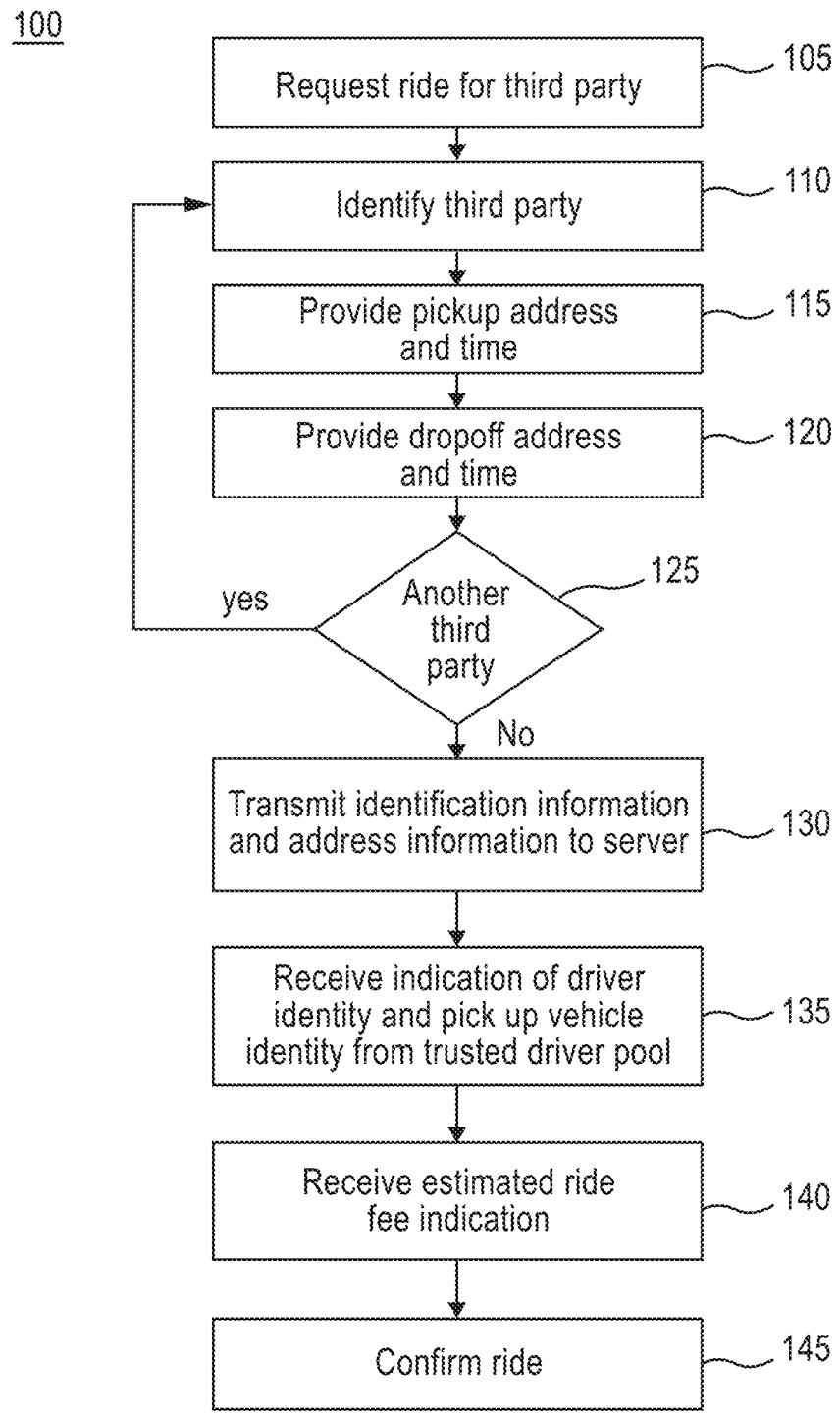
FIG. 1 illustrates flowchart for a method of scheduling a ride service for one or more third party users using a driver from a trusted pool of drivers.

FIG. 1 illustrates an exemplary method 100 that is executed by a system to allow a user to request a ride service for a third party, especially a vulnerable third party. A user may install a program which executes method 100 on a user device. The user device may be a computing device. Examples of computing devices include desktop computers, laptop computers, tablets, game consoles, personal computers, notebook computers, and any other electrical computing device with access to processing power sufficient to interact in a timely manner with a server computer. The user device may include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein.

A user may use the user device to request a ride for a third party at step 105 by interacting with the user computing device, as will be discussed below. For example, a graphical user interface may be provided via a display associated with the user computing device which includes one or more interactive elements which allows a user to select an interactive element corresponding with requesting a ride service for a third party. It is to be noted that the user is the ride requestor but not necessarily a ride service recipient. In one embodiment, a user may be a parent scheduling a ride for a child. Thus, the ride requestor may be considered to be the parent while the third party rider is a child. In this way, the parent may schedule a ride for a child during which the safety of the child may be protected. In a preferred embodiment, the third party may be riding alone or with another third party and without the ride requestor. It is also to be noted that any vulnerable person may be considered a third party rider and may benefit from a ride scheduled using method 100. Vulnerable persons may include anyone with a reduced mental capacity or whose judgment or life experience is less than what a reasonable person may require to adequately assess the safety of a particular situation, such as getting in a car with an unknown driver.

Once the user has requested a ride for a third party in step 105 of method 100, the user may then identify the third party to be picked up for the ride service at step 110. Continuing with the previous example, a parent may schedule a ride for a child at step 105 and identify the child as the third party rider who will be receiving the ride at step 110. The user may interact with the user device to provide a pictorial representation of or picture representative of the third party to be picked up for the ride service or may otherwise provide identifiers for the third party.

At step 115, the user inputs a pickup address and a pickup time for the third party's ride into the user device. At step 120, the user inputs a dropoff address and a dropoff time for the third party's ride into the user device. At this point, the user device may access a map program to assess the distance and approximate time between the pickup address and the dropoff address and ensure that enough time has been allotted between pickup and dropoff such that the ride can be completed during the defined timeframe. Should the map program indicate that the requested ride may take longer than expected, the user device may be configured to inform the user that additional time is required to complete the ride and recommend a new pickup time or a new dropoff time.

At step 125, method 100 being executed on a user device may query the user as to whether or not another third party is riding with the third party identified in step 110 of method 100. For example, the user may be scheduling a ride for elderly parents. Step 125 allows the user to identify exactly who should be picked up for the ride requested in step 105. In this example, both the user's mother and father may be identified as third party riders. If another third party will be riding (step 125—yes), method 100 returns to step 110 and requests that the user identify the new third party at step 110, just as before. The user may also provide a pickup address and time (if different) and a dropoff address and time (if different) for the second third party. In this embodiment, it is possible, for example, that a parent may request a ride for two children who are both to be picked up at the local elementary school and dropped off in two separate locations (e.g., one child is dropped off at home while the other is dropped off at baseball practice). When each third party has been identified and no other third parties are to be picked up (Step 125—No), method 100 proceeds to step 130.

At step 130, the user device may transmit the provided identification information and the provided address information to one or more server computing devices for processing. The one or more server computing devices may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute all or some of method 100. The one or more server computing devices may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable media, data processors, processing devices, control devices, transmitters, receivers, antennas, transceivers, input devices, output devices, network interface devices, and other types of components that are apparent to those skilled in the art. These hardware components within one or more server computing devices may be used to execute the various methods or algorithms disclosed herein and interface with the user device.

In one embodiment, the user device may access or transmit the identification and address information to the one or more server computing devices via an internet connection to one or more server computing devices. Any suitable internet connection may be implemented including any wired, wireless, or cellular based connections. Examples of these various internet connections include implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between the user device and the one or more server computing devices.

Identification information provided at step 130 may, in addition to identifying third party riders, also provide the server with access to information about people within the user's social network sphere who have agreed to be driving service providers. Alternatively or additionally, the user may provide further indications of neighbors, telephone contacts, or other individuals with whom the user has a personal relationship who have also agreed to be driving service providers. Alternatively or additionally, the user device may transmit identification information of other drivers who have previously served the user's family, extended family, or close friends. Individuals who meet these criteria or who are explicitly identified by the user as trusted service providers, constitute a trusted driver pool. The trusted driver pool may be subset of drivers who have agreed to provide driving services for potential ride requestors. In other words, not every driver who provides driving services may be included within the trusted driver pool.

Based on the information transmitted in step 130, the user device may receive an indication of a driver's identity and a pickup vehicle identity at step 135 from the one or more server computer devices. The indicated driver information received at step 135 may provide information about a driver selected from the trusted driver pool and the driver's vehicle. For example, the indicated driver information may identify the driver, how the driver came to be in the user's trusted pool of drivers, a video introducing the driver, certification information, and other information. Information about the driver's vehicle may include a color of the vehicle, a make of the vehicle, a model of the vehicle, and the license plate number of the vehicle.

At step 140, the user device may receive an estimated fee indication associated with the requested ride from the server. The user device may calculate the distance associated with the requested ride, the number of pickups, the number of third party riders, and the number of dropoffs and calculate a fee for the ride service provider (i.e., the driver), to provide the ride sharing service. If the user accepts the quoted fee, method 100 continues to step 145 where the user may receive confirmation of the ride.

Step 145 provides a confirmation of the ride to the user from the server. In another embodiment, the user device may be configured to transmit information to a device associated with a third party providing information about the ride itinerary, driver information, vehicle information, and other information. For example, the user device may transmit a password to the third party rider or riders which is also known to the driver who is to provide the ride sharing service to the third party. When the driver arrives and provides the third party with the password, the third party can be assured that the driver has been selected from a trusted pool of drivers by the user, or in response to the user's ride request, and that the third party will be safe in the care of the driver during the ride.

Confirmation of the ride at step 145 may include a real time indication of ride progress. For example, the user device may provide real time representation on a display screen of the user device of the vehicle at a particular location on a map which indicates the current location of the vehicle. The user device may indicate that the third party has been picked up in real time, that the ride is in progress in real time, and when the third party has been dropped off at the destination in real time. In this manner, the user may be assured of the third party's location and status throughout the ride service.

Finally, with respect to method 100, other alternative options may be possible. For example, a user may be able to create repeated trips by the same driver or another trusted driver by accessing a calendar. In other words, the user may be able to repeat particular ride requests automatically on particular days, such that every Monday, Wednesday, and Friday, for example, the same ride will be requested and provided to the third party. In one embodiment, the driver may also be hired as a babysitter to spend a certain amount of time with the third party in addition to providing the requested ride to the third party. The driver may also perform other services such as food pickup or grocery shop at the user's request. The user device may also be configured to provide feedback ratings for particular drivers, provide indications of upcoming scheduled rides, or indications of completed rides.

Figure 2:
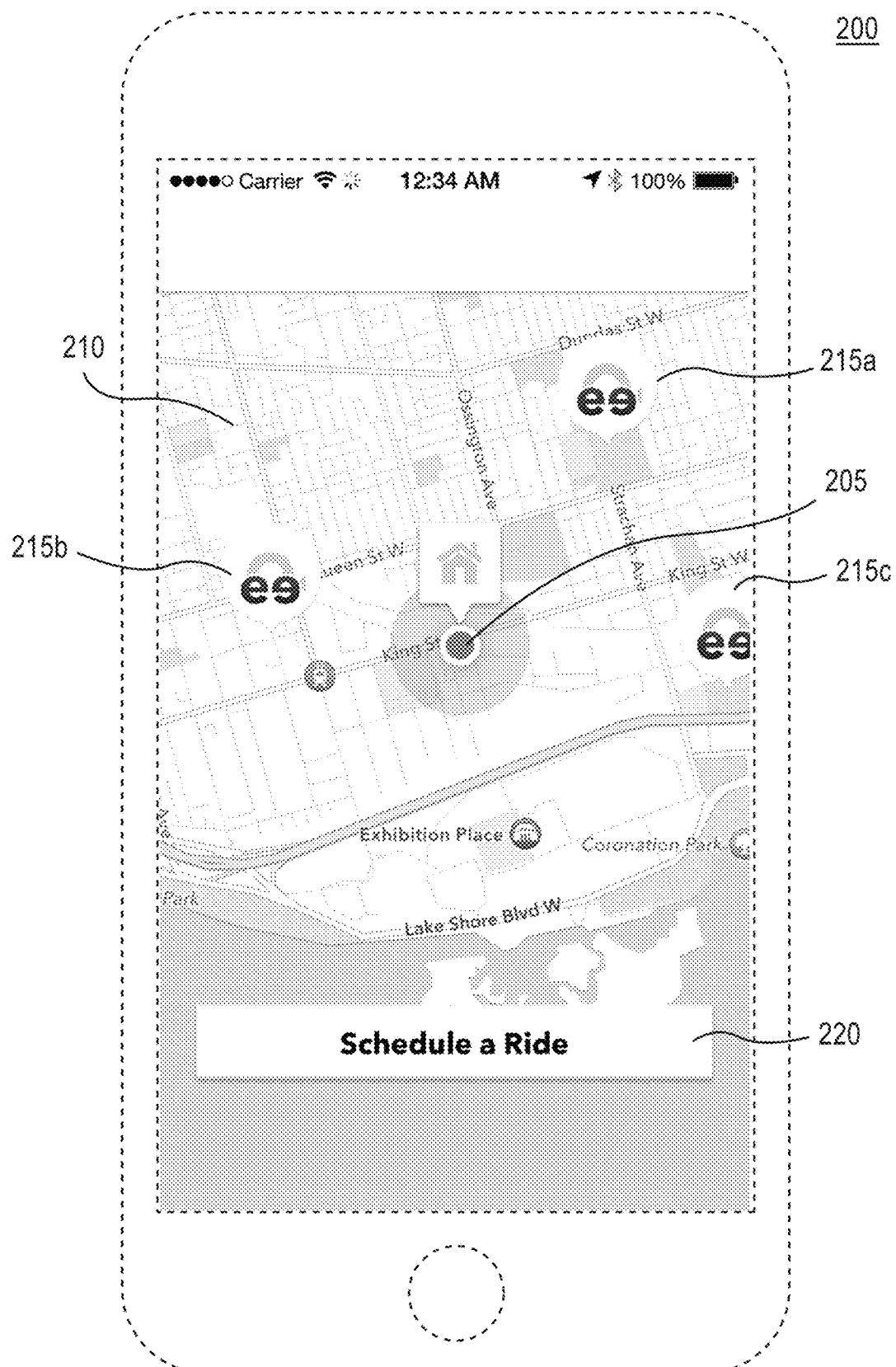
FIG. 2 illustrates a graphical user interface allowing a user to schedule a ride for a third party.

FIG. 2 illustrates a graphical user interface 200 of a user device allowing a user to schedule a ride for a third party. User interface 200 includes an indication of the user's current location or the user's home 205 on a map 210 of the area surrounding the user's current location or the user's home. The map further includes indications of one or more active service providers (i.e., drivers). In map 210, drivers 215a, 215b, and 215c are shown by an indicator on the map corresponding to a current location for drivers 215a, 215b, and 215c. The user may request a ride to be provided to a third party by interacting with an interactive element, such as interactive element 220.

Figure 3:
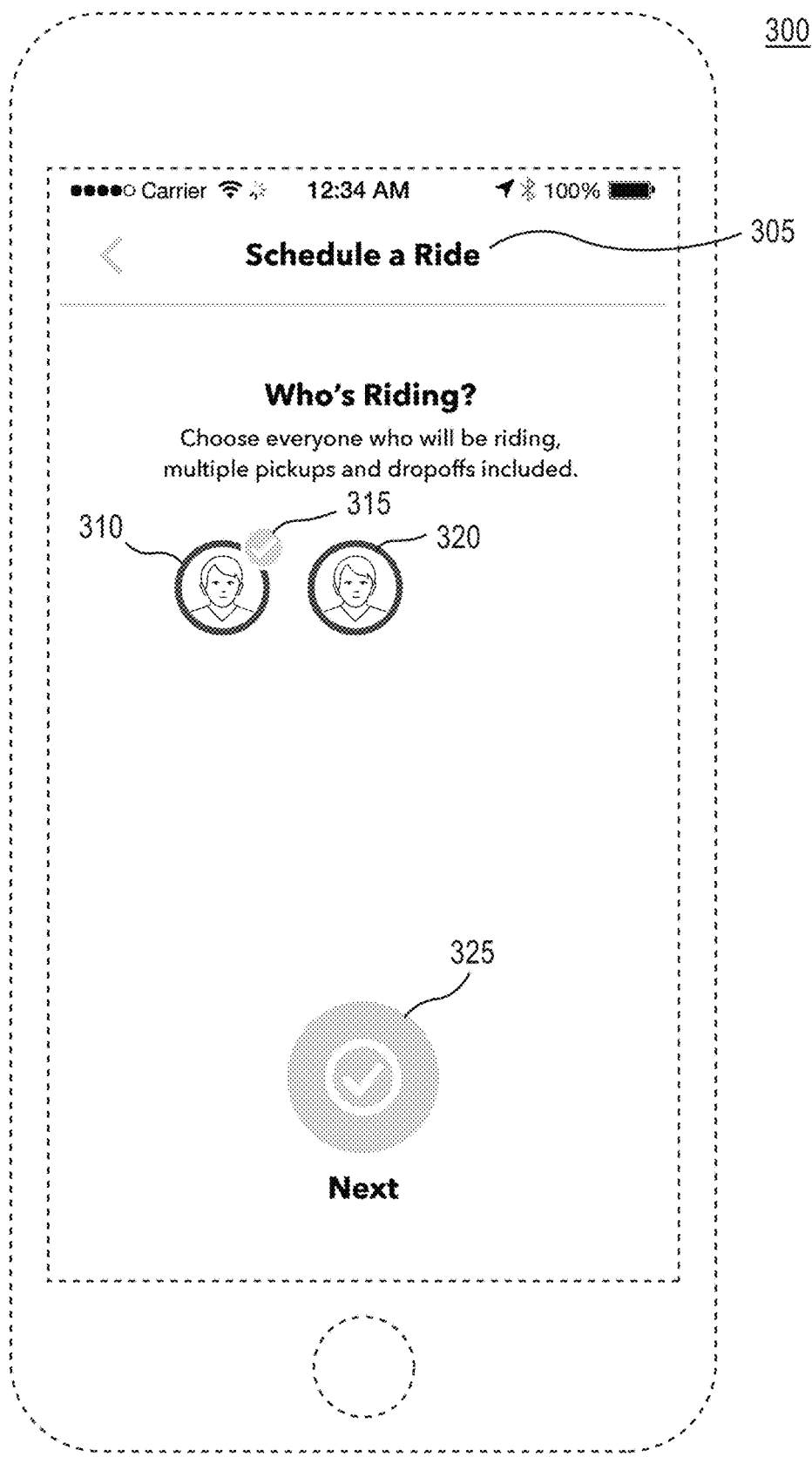
FIG. 3 illustrates a graphical user interface allowing the user to identify third party riders.

FIG. 3 illustrates a graphical user interface 300 of a user device allowing the user to identify third party riders. Graphical user interface 300 is provided to the user in response to the user interacting with interactive element 220 shown in FIG. 2. Graphical user interface 300 indicates that the user is scheduling a ride with indicator 305 and allows the user to select pictorial representation 310 or pictorial representation 320 of one or more third parties for whom the user is requesting the ride. By selecting pictorial representation 310, graphical user interface 300 indicates the selection of pictorial representation 310 with a selection indicator, such as selection indicator 315. Selection indicator 315 indicates that the third party whose pictorial representation has been selected will be riding in the ride being requested by the user. Graphical user interface 300 further includes a next interactive element 325 that may be used to proceed with requesting the ride for the selected third party.

Figure 4:
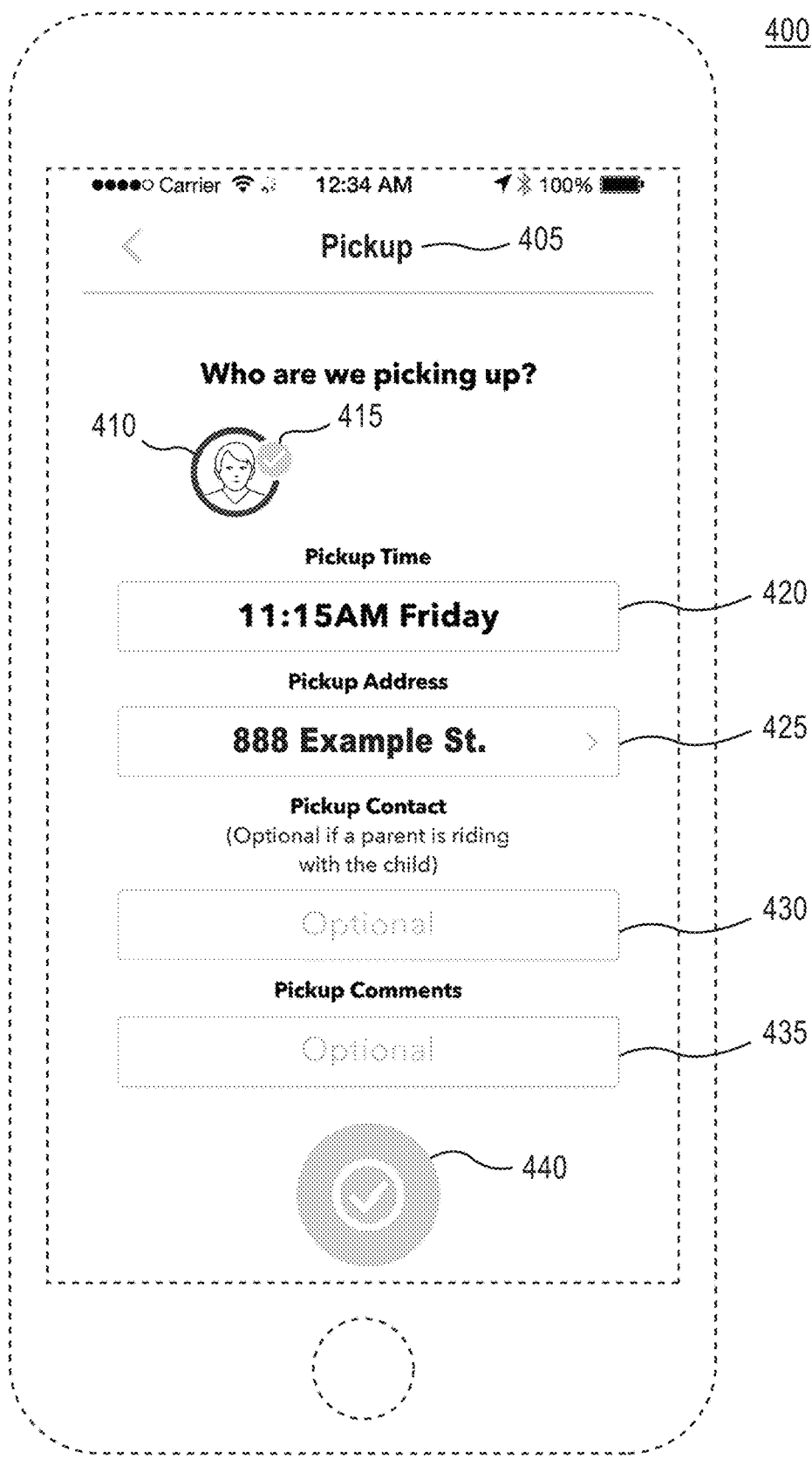
FIG. 4 illustrates a graphical user interface allowing a user to identify a third party to be picked up.

FIG. 4 illustrates a graphical user interface 400 of a user device allowing a user to identify a third party to be picked up. Graphical user interface 400 is provided to the user in response to the user interacting with next interactive element 325 shown in FIG. 3. Graphical user interface 400 indicates that the user is providing information for a pickup 405 and incorporates the pictorial representation 410 of the third party to be picked up and the selection indicator 415 (which are similar to pictorial representation 310 and selection indicator 315 shown in FIG. 3).

Graphical user interface 400 allows the user to request a pickup time 420 for the service provider to pick up the third party rider. In the example of graphical user interface 400, the user has requested that the third party rider be picked up at 11:15 AM on Friday. While a date is not shown in graphical user interface 400, pickup time 420 may also include a date. Graphical user interface further includes a pickup address 425. In the example of graphical user interface 400, the user has requested that the third party be picked up at 888 Example St. Graphical user interface 400 may also optionally include a pickup contact 430 and pickup comments 435 for the service provider (i.e., driver). A pickup contact 430 may be the name of a person who currently has guardianship or physical custody of the third party. For example, if the third party is a child who is being picked up from school, the child's teacher Mrs. Heaps, may be the pickup contact. Pickup comments 435 may include a password known to the driver and the child, a description of the child's clothing or backpack, radio stations the child likes, topics the child finds interesting to talk about, and any other information the ride requestor wishes to convey to the service provider (i.e., driver).

Once the user has provided pickup time 420, pickup address 425, optional pickup contact 430, and optional pickup comments 435, the user may continue with the ride request by interacting with next interactive element 440 provided in graphical user interface 400.

Figure 5:
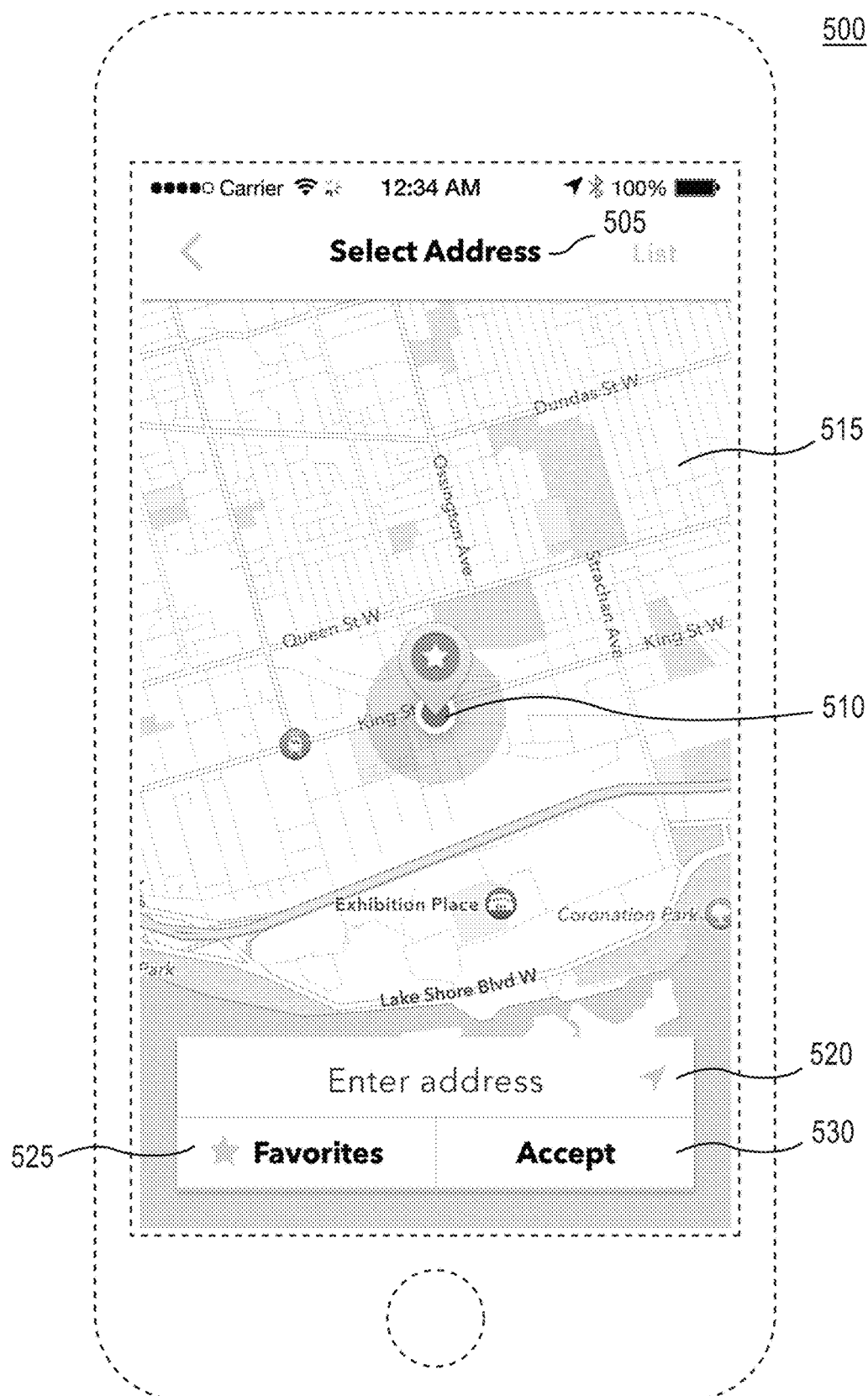
FIG. 5 illustrates a graphical user interface allowing a user to input a pickup address for the third party.

FIG. 5 illustrates a graphical user interface 500 of a user device allowing a user to input a pickup address for the third party. Graphical user interface 500 is provided to the user in response to the user interacting with next interactive element 425 shown in FIG. 4. Graphical user interface 500 includes an indicator 505 that graphical user interface 500 is for selecting a dropoff address for the ride request. Graphical user interface 500 may include an indicator 510 of the user's current location or the user's home on a map 515. Graphical user interface 500 further provides an address window 520 in which the user may enter the dropoff address for the requested ride. The user may also select a favorites interactive element 525 which allows the user to select a dropoff location from a list of previous or favorite dropoff locations in order to relieve the user from repeatedly entering the same address for the dropoff. Once an address has been provided in address window 520 or via favorites interactive element 525, the user may accept the address input by interacting with accept interactive element 530.

Figure 6:
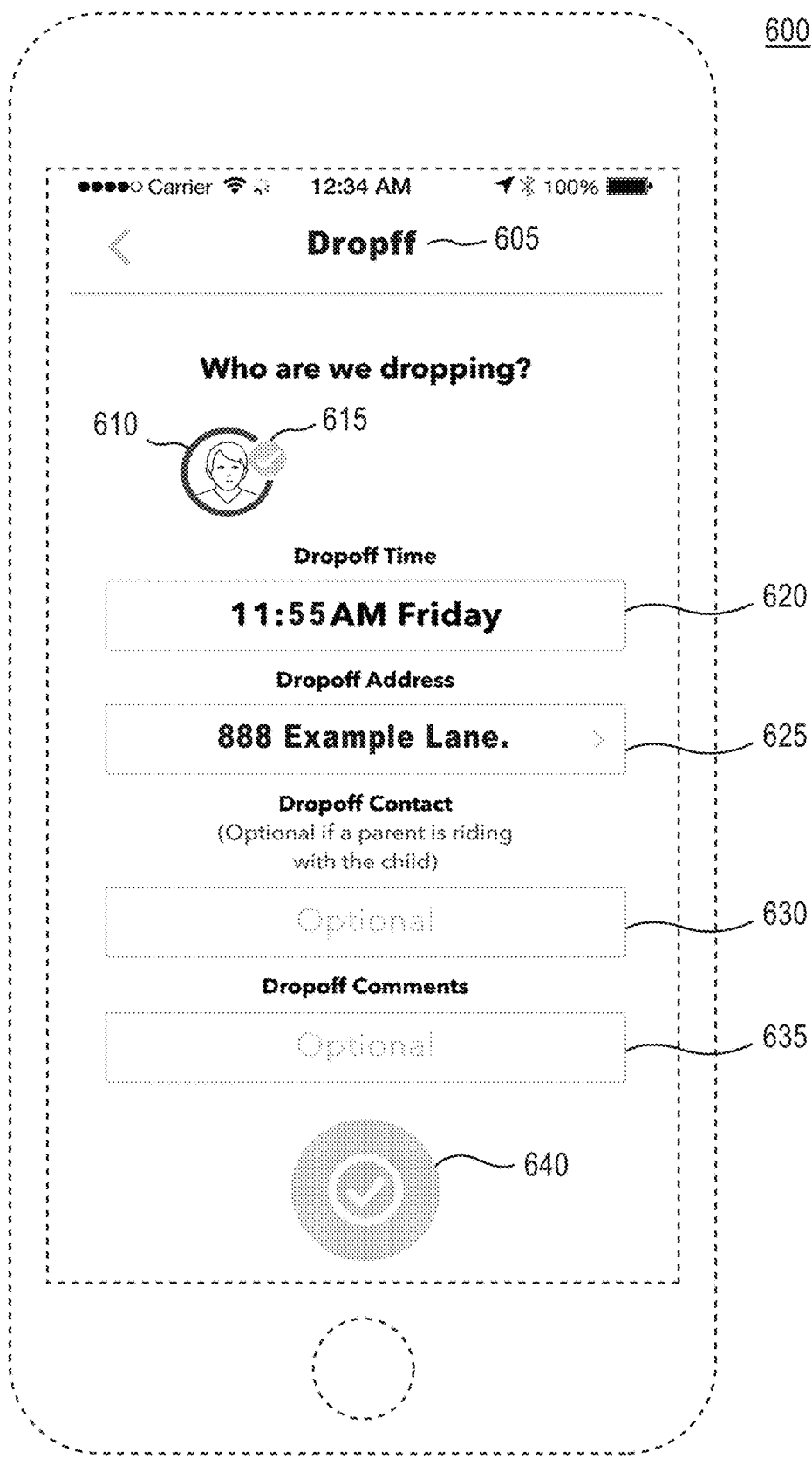
FIG. 6 illustrates a graphical user interface allowing a user to identify a dropoff address for the third party.

FIG. 6 illustrates a graphical user interface 600 of a user device allowing a user to identify a dropoff address for the third party. Graphical user interface 600 is provided to the user in response to the user interacting with accept interactive element 525 shown in FIG. 5. Graphical user interface 500 indicates that the user is providing information for a dropoff 605 and incorporates the pictorial representation 610 of the third party to be dropped off and the selection indicator 615 (which are similar to pictorial representation 310/410 and selection indicator 315/415 shown in FIG. 3 and FIG. 4).

Graphical user interface 600 allows the user to request a dropoff time 620 for the service provider to drop off the third party rider. In the example of graphical user interface 600, the user has requested that the third party rider be dropped off at 11:55 AM on Friday. While a date is not shown in graphical user interface 600, pickup time 620 may also include a date. Graphical user interface further includes a dropoff address 625. In the example of graphical user interface 600, the user has requested that the third party be dropped off at 888 Example Lane. Graphical user interface 600 may also optionally include a dropoff contact 630 and dropoff comments 635 for the service provider (i.e., driver). A dropoff contact 430 may be the name of a person who will take guardianship or physical custody of the third party. For example, if the third party is a child who is being dropped off at football practice, the child's coach, Coach Miller, may be the dropoff contact. Dropoff comments 435 may include information about the dropoff contact's likeness, a particular dropoff location (e.g., by the goal posts), a password known to the coach and the child, and any other information the ride requestor wishes to convey to the service provider (i.e., driver).

Once the user has provided dropoff time 620, dropoff address 625, optional dropoff contact 630, and optional dropoff comments 635, the user may continue with the ride request by interacting with next interactive element 640 provided in graphical user interface 600.

Figure 7:
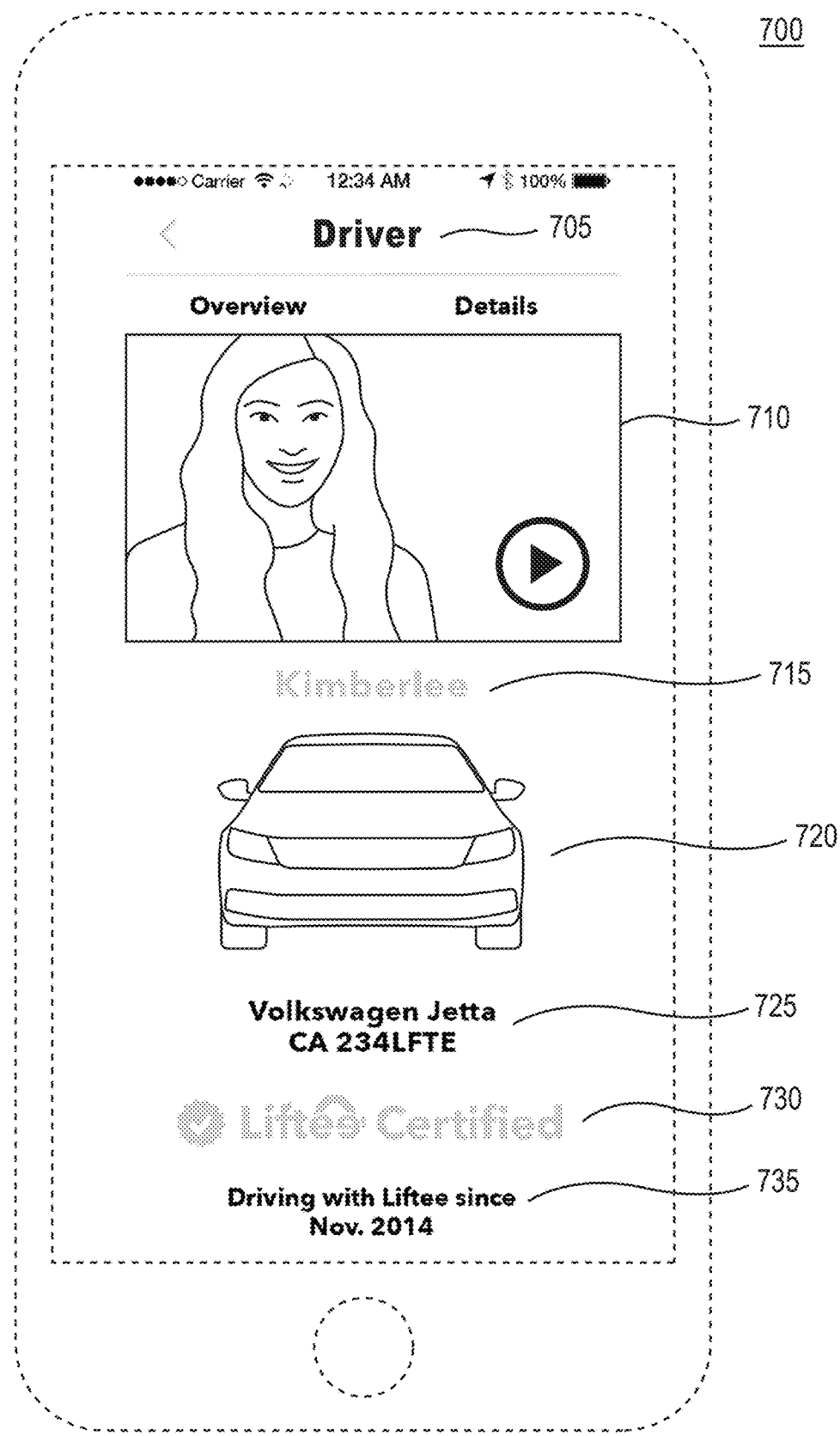
FIG. 7 illustrates a graphical user interface allowing a user to identify a driver from a trusted driver pool.

FIG. 7 illustrates a graphical user interface 700 for a user device allowing a user to identify a driver from a trusted driver pool or allowing a user to receive an assignment of a driver from a trusted driver pool. Graphical user interface 700 is provided to the user in response to the user interacting with next interactive element 640 shown in FIG. 6. Graphical user interface 700 includes an indicator 705 that graphical user interface 700 identifies the driver for the third party. Graphical user interface 700 may include information about the driver and may include a video 710 introducing the driver to the user. Graphical user interface may further include the driver's name 715.

Graphical user interface 700 may also include information about the driver's vehicle 720. The vehicle 720 may show an exact picture of the driver's vehicle or may show a car of a similar make, model, model year, and color. Graphical user interface 700 may further include textual information about vehicle 720 such as the make and model "Volkswagen Jetta" and include the driver's license information and state "CA 234LFTE" to ensure positive identification of the vehicle by the third party. Graphical user interface 700 may further identify the driver, Kimberlee, with textual information 730 indicating that she is certified and textual information 735 conveying the length of time she has been a rideshare service provider. By interacting with graphical user interface 700, the user may convey to the server that Kimberlee is an acceptable service provider and proceed to graphical user interface 800 of FIG. 8.

Figure 8:
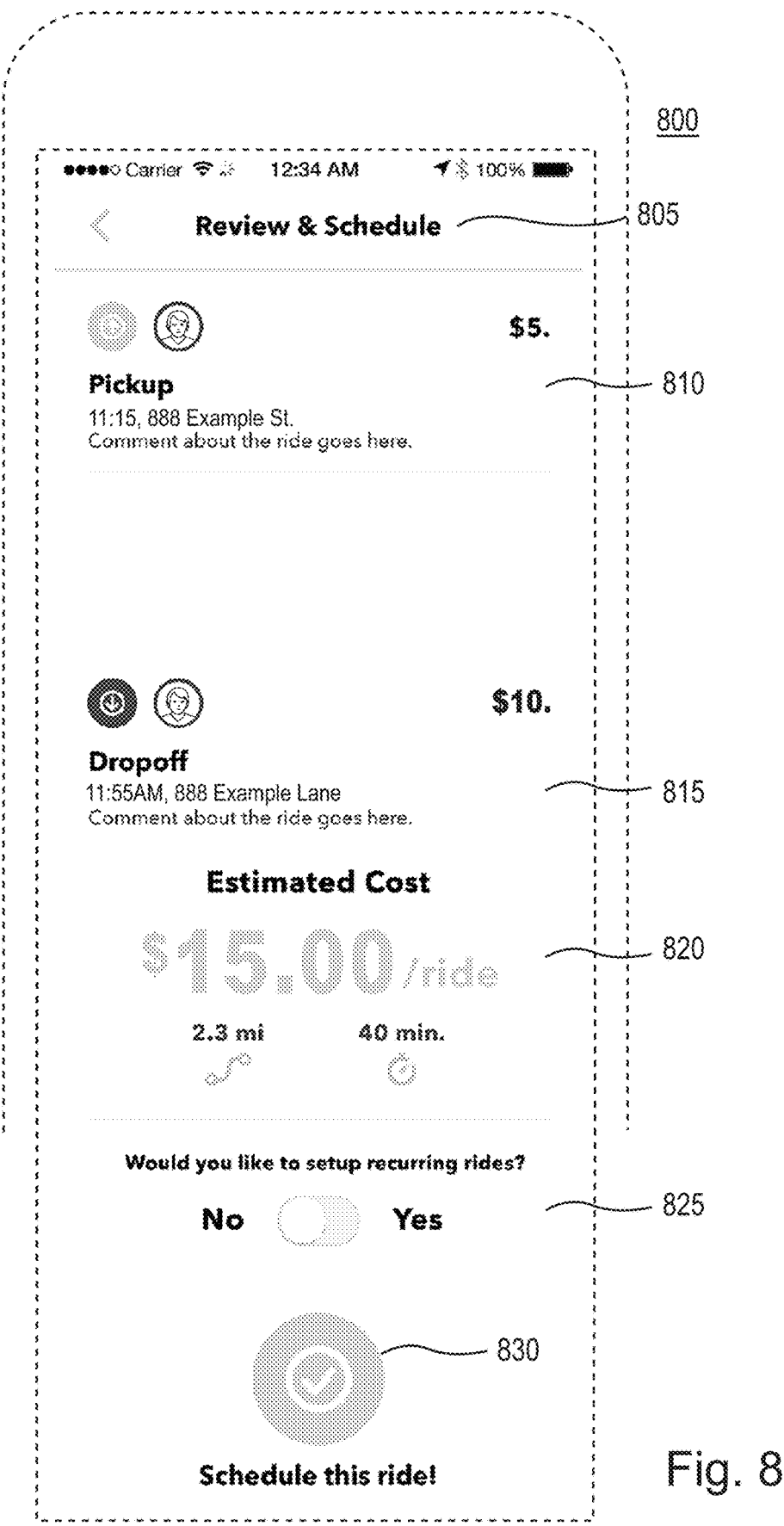
FIG. 8 illustrates a graphical user interface providing an itinerary confirmation and estimated ride fee.

FIG. 8 illustrates a graphical user interface 800 of a user device providing an itinerary confirmation and estimated ride fee. Graphical user interface 800 includes an indicator 805 that graphical user interface 800 provides the user with the opportunity to review and schedule the itinerary created by interacting with graphical user interfaces 100-700 as shown and discussed above. Graphical user interface 800 includes a review of the pickup information 810 and a review of the dropoff information 815 along with any comments provided by the user. Graphical user interface 800 further includes estimated cost or fee information 820 associated with the requested ride, including an estimated distance to be traveled and an estimated travel duration for the requested ride.

Graphical user interface 800 may further allow the user to set up the requested ride as a recurring ride by interacting with toggle button 825. Once the user has reviewed the itinerary, the user may schedule the ride by interacting with schedule interactive element 830.

Figure 9:
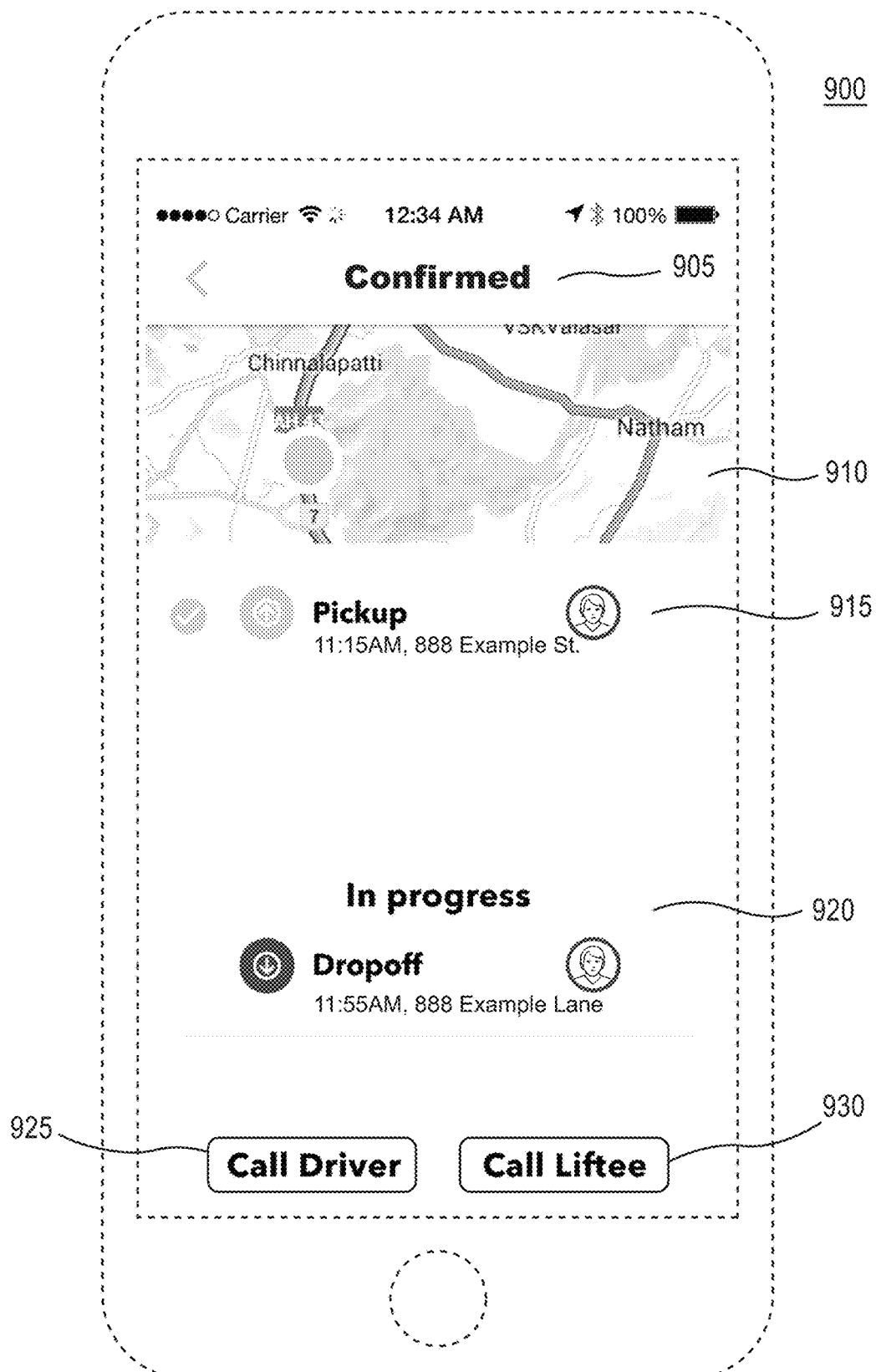
FIG. 9 illustrates a graphical user interface providing a confirmation the ride has begun and a real time progress of the ride.

FIG. 9 illustrates a graphical user interface 900 of a user device providing a confirmation that the ride has begun and a real time progress of the ride. Graphical user interface 900 is provided to the user in response to the user interacting with schedule interactive element 830 shown in FIG. 8. Graphical user interface 900 includes an indicator 905 that the requested ride has been confirmed. At this point, the user may follow the progress of the ride via a map 710 that includes an indicator of a current location of the ride vehicle. Graphical user interface 900 may include updated information 915 to show that the third party has been picked up at the proper time, that the ride is in progress, and information 920 that the ride is scheduled to terminate at the requested time and the requested dropoff location.

Should a problem arise with the real-time progress of the ride, the user is provided with an interactive element 925 that allows the user to call the driver directly to inquire as to the status of the third party or the progress of the ride. Further, if the user has a problem contacting the driver or with the driver, the driver may call the driver's employer or supervisor by interacting with an interactive element 930 that allows the user to call the employer/supervisor directly. When the ride has been completed, graphical user interface 900 is updated to show that the dropoff has been completed and the ride is over. The user may then be assured that the third party has been safely delivered to the dropoff location.

Other implementations are possible, though not shown. For example, a user ride requestor may create a profile for each third party rider who may benefit from access to a ride provisioning service. The profile information may be shared with others that may have temporary custody of a third party rider. For example, a parent may be able to share a child's profile information with a school administrator, a teacher, a guardian, or a coach. When given access to the third party rider's profile, these temporary guardians may also be able to request a ride for the third party rider in the same manner as the user ride requestor would request the same service.

In another embodiment, a user ride requestor may request an option to create a carpool with other user ride requestors to transport children to the same location. In this manner, for example, a first parent with a first child may invite a second parent with a second child to join a carpool such that the first child and the second child may ride to a school together. Based on information provided by the first parent and the second parent, the ride provisioning service may dispatch a driver to pick up each child at their respective homes and take them together to the destination of their parents' choosing.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A method of requesting a ride for a third-party rider by a user, comprising: transmitting, by a user device, a ride request to a server for a third-party rider; determining, by a user device, a social network sphere of potential drivers; identifying, by a user device, a set of trusted drivers based on the similarities in the social network sphere of the drivers and the social network sphere of the user; receiving, by the user device a display of an identification of a driver from a set of trusted drivers among a pool of drivers who is at least one of within the social network sphere of the user and personally known to the user; transmitting, by the user device, a password set by the user to a device associated with the driver; transmitting, by the user device, the password set by the user to a device associated with the third-party rider; determining, by the user device and based on password information obtained from the device associated with the third party rider and the device associated with the driver, that the password associated with the driver and the password associated with the third-party rider match; receiving, by the user device and the device associated with the third-party rider, a ride start confirmation in response to the determination that the password associated with the driver and the password associated with the third party rider match; displaying, by the user device the ride start confirmation including a ride itinerary on a display screen of the user device; and displaying, by the user device, an estimated time of arrival and location of a vehicle associated with a driver in real time on the display screen of the user device which both update on the display screen of the user device as the vehicle moves along the ride itinerary.

2. The method of claim 1, wherein the user device transmits to the server one or more personal interests of the third-party rider.

3. The method of claim 2, wherein the server transmits to the device associated with the driver the one or more personal interests of the third-party rider.

4. The method of claim 1, wherein the user device transmits a ride request to a server for a second third-party rider at a second location.

5. The method of claim 4, wherein the server calculates a second pick up time for a second location for the second third-party rider.

6. The method of claim 4, wherein the server calculates a second drop-off time for a second drop-off location for the second third-party rider.

7. The method of claim 1, wherein the user device sends information to the server concerning the identity of a contact person located at the drop-off location.

8. The method of claim 7, wherein the user device transmits a password to the contact person at the drop-off location.

9. The method of claim 1, wherein the user device inputs a particular ride requests that occurs on a particular day of the week.

10. The method of claim 9, wherein the user device sets up an automatic repeat for the particular ride that occurs on the particular day of the week.

11. A system for requesting a ride for a third-party rider by a ride requestor, comprising: a user device, including a processor to: transmit a ride request to a server for a third party rider; determine a social network sphere of potential drivers; identify a set of trusted drivers based on the similarities in the social network sphere of the drivers and the social network sphere of the user; receive a display of an identification of a driver from a set of trusted drivers among a pool of drivers who is at least one of within the social network sphere of the user and personally known to the user; transmit a password set by the user to a device associated with the driver; transmit the password set by the user to a device associated with the third-party rider; determine, based on password information obtained from the device associated with the third party rider and the device associated with the driver, that the password associated with the driver and the password associated with the third-party rider match; and receive a ride start confirmation in response to the determination that the password associated with the driver and the password associated with the third party rider match; display, the ride start confirmation including a ride itinerary on a display screen of the user device; and display an estimated time of arrival and location of a vehicle associated with a driver in real time on the display screen of the device which both update on the display screen of the device as the vehicle moves along the ride itinerary.

12. The system of claim 11, wherein the user device transmits to the server one or more personal interests of the third-party rider.

13. The system of claim 12, wherein the user device transmits to the device associated with the driver the one or more personal interests of the third-party rider.

14. The system of claim 11, wherein the user device requests to a server for a second third-party rider at a second location.

15. The system of claim 14, wherein the server calculates a second pick up time for a second location for the second third-party rider.

16. The system of claim 14, wherein the server calculates a second drop-off time for a second drop-off location for the second third-party rider.

17. The system of claim 11, wherein the user device sends information to the server concerning the identity of a contact person located at the drop-off location.

18. The system of claim 17, wherein the user device transmits a password to the contact person at the drop-off location.

19. The system of claim 11, wherein the user device requests a particular ride that occurs on a particular day of the week.

20. The system of claim 19, wherein the user device sets up an automatic repeat for the particular ride that occurs on the particular day of the week.

* * * * *